(12) United States Patent
Vankeirsbilck et al.

(10) Patent No.: US 12,331,476 B2
(45) Date of Patent: Jun. 17, 2025

(54) SYSTEM FOR COUPLING OF PILES (71) Applicant: OLIVIER NV, Roeselare (BE)

(72) Inventors: Gerdi Vankeirsbilck, Rumbeke (BE);
Dimitry Vankeirsbilck, Roeselare (BE)

(73) Assignee: OLIVER NV, Roeselare (BE)

( * ) Notice: Subject to any disclaimer, the term of this patent is extended or adjusted under 35 U.S.C. 154(b) by 25 days.

(21) Appl. No.: 18/226,173

(22) PCT Filed: Jan. 20, 2022

(86) PCT No.: PCT/IB2022/050455
§ 371 (c)(1),
(2) Date: Jul. 25, 2023

(87) PCT Pub. No.: WO2022/157650
PCT Pub. Date: Jul. 28, 2022

(65) Prior Publication Data
US 2024/0150987 A1   May 9, 2024

(30) Foreign Application Priority Data
Jan. 25, 2021  (BE) .................................. 2021/5050

(51) Int. Cl.
*E02D 5/52* (2006.01)
*F16L 21/08* (2006.01)

(52) U.S. Cl.
CPC .............. *E02D 5/526* (2013.01); *F16L 21/08* (2013.01); *E02D 2200/1685* (2013.01); *E02D 2600/20* (2013.01)

(58) Field of Classification Search
CPC ........... E02D 5/526; E02D 5/523; E02D 5/52; E02D 2600/20

(Continued)

(56) References Cited

U.S. PATENT DOCUMENTS 3,345,826 A * 10/1967 Hignite .................. E02D 5/665
                                                   175/320
6,183,167 B1 * 2/2001 Ruiz ....................... F16B 7/042
                                                   405/253

(Continued)

FOREIGN PATENT DOCUMENTS

CN          109610448 A       4/2019
DE            1097929 B       1/1961

(Continued)

OTHER PUBLICATIONS

International Search Report and Written Opinion for Application No. PCT/IB2022/050455; mailing date of May 4, 2022.

*Primary Examiner* — Frederick L Lagman
(74) *Attorney, Agent, or Firm* — FRESH IP PLC; Clifford D. Hyra; Aubrey Y. Chen (57) ABSTRACT

Disclosed is an attachment system for detachably coupling a female tube end and a male tube end to each other to form foundation piles. The system includes
corresponding cylindrical sleeve holes in tube sleeves of the tube ends;
a coupling element which is fittable in the sleeve holes and rotatable through an angle therein;
a blocking pin on the coupling element or on one of the sleeve holes; and
a blocking slot in one of the sleeve holes or in the base body, so that the blocking pin engages in the blocking slot upon rotation of the coupling element in the sleeve holes.
Additionally, one of the sleeve holes and the base body can be provided with corresponding sleeve slots in order to form a fitting hole together to fit a blocking element therein, in order to prevent rotation of the coupling element in the sleeve holes.

14 Claims, 7 Drawing Sheets

(58) Field of Classification Search
USPC .......................................................... 405/251
See application file for complete search history.

(56) References Cited

U.S. PATENT DOCUMENTS

| | | | | |
|---|---|---|---|---|
| 7,220,081 | B1* | 5/2007 | Gantt, Jr. ................ | E02D 27/12 |
| | | | | 405/230 |
| 7,314,335 | B2* | 1/2008 | Whitsett .................. | E02D 5/38 |
| | | | | 405/253 |
| 7,744,316 | B2* | 6/2010 | Kaufman .............. | E02D 35/005 |
| | | | | 405/230 |
| 10,024,019 | B1* | 7/2018 | Hunter ..................... | E02D 5/56 |
| 2004/0076479 | A1* | 4/2004 | Camilleri ................ | E02D 5/56 |
| | | | | 405/252.1 |
| 2015/0071712 | A1* | 3/2015 | Kemp ...................... | E02D 5/56 |
| | | | | 405/251 |
| 2019/0249387 | A1* | 8/2019 | Horie ....................... | E02D 5/24 |
| 2021/0262187 | A1* | 8/2021 | Curry ...................... | F16B 7/042 |
| 2021/0388570 | A1* | 12/2021 | Tupala .................... | E02D 5/526 |
| 2022/0106758 | A1* | 4/2022 | Waltz ...................... | E02D 5/56 |

FOREIGN PATENT DOCUMENTS

| | | |
|---|---|---|
| DE | 4402202 A1 | 7/1995 |
| FR | 2179718 A1 | 11/1973 |
| JP | 5021437 B2 | 9/2012 |

* cited by examiner

SYSTEM FOR COUPLING OF PILES

This application is a National Phase entry of International Application No. PCT/IB2022/050455 under § 371 and claims the benefit of Belgian Patent Application No. BE-2020/5050, filed Jan. 25, 2021, which is hereby incorporated by reference in its entirety.

FIELD OF THE DISCLOSURE

The present disclosure relates to an attachment system for detachably coupling a female tube end and a male tube end to each other in order to form foundation piles, comprising:
- a cylindrical sleeve hole in a tube sleeve of the female tube end;
- a corresponding cylindrical sleeve hole in a tube sleeve of the male tube end which is alignable with the sleeve hole in the female tube end when the male tube end is being fitted in the female tube end; and
- a coupling element which comprises a cylindrical base body which is fittable in these sleeve holes when the sleeve holes have been aligned with respect to each other, in order to couple the tube ends to each other.

The term cylindrical is understood to mean that the shape is substantially essentially the shape of a cylinder with a circular base area. In this case, this shape may also be provided with protuberances and/or openings and/or bevels with respect to this cylindrical basic form. Thus, the base area of a cylindrical sleeve hole which is configured as an opening in a curved tube sleeve may, for example, also be similarly curved.

The sleeve holes are alignable when they can be arranged so as to adjoin one another in such a way that they form a substantially cylindrical hole together which has a shape which substantially corresponds to the shape of the cylindrical base body of the coupling element.

The coupling element is fittable in these sleeve holes when it can extend substantially in these sleeve holes. In this case, the coupling element may protrude slightly with respect to these sleeve holes, but will still substantially extend within the space of these sleeve holes, for example a tube formed thereby can freely be arranged in the ground and concrete can be poured freely via a tube which has been formed thereby.

Often, said tube ends have to be coupled to each other in order to produce foundation piles. These tube ends may form part of tube parts to be coupled in order to form a tube together or, for example, to form part of a wear part, such as for example a drill bit to be coupled to a tube part.

BACKGROUND

Nowadays, there are already many commercially available attachment systems for coupling tubes which are used to form foundations or foundation piles in the ground.

These attachment systems are usually complicated and expensive to construct and are often difficult to uncouple in practice.

In many cases, existing couplings use a screw thread in order to lock everything together. However, a screw thread is not very strong in combination with ground and concrete, as a result of which such couplings are very susceptible to wear.

JP 5021437 B2 illustrates an attachment system which is often used to couple tube ends to each other in order to form foundation piles. In this case, coupling elements which are provided in sleeve holes in the tube ends to this end are screwed onto an internal band by bolts.

U.S. Pat. No. 8,397,364 B2 presents various attachment systems which use elastic seals so as to be able to eliminate screw threads. In this case, the couplings are relatively complicated and not very suitable for use when pouring concrete in order to form foundation piles.

SUMMARY

It is an object of embodiments of the present disclosure to provide such an attachment system by means of which tube ends for forming foundation piles can be coupled in a simple and durable way without the use of screw threads or elastic seals.

This object may be achieved by providing an attachment system for detachably coupling a female tube end and a male tube end to each other in order to form foundation piles, comprising:
- a cylindrical sleeve hole in a tube sleeve of the female tube end;
- a corresponding cylindrical sleeve hole in a tube sleeve of the male tube end which is alignable with the sleeve hole in the female tube end when the male tube end is being fitted in the female tube end; and
- a coupling element, which comprises a cylindrical base body which is fittable in these sleeve holes when the sleeve holes have been aligned with respect to each other, in order to couple the tube ends to each other;
- a blocking pin which is provided on and extends radially with respect to the base body or one of the sleeve holes; and
- a blocking slot which is respectively provided in one of the sleeve holes or the base body and in which the blocking pin is fittable;

wherein the blocking pin and the blocking slot are arranged in such a way that the coupling element is rotatable through an angle after it has been fitted in the sleeve holes, wherein the blocking pin is fitted in the blocking slot with guiding action;

and wherein at least one sleeve hole and the base body are provided with corresponding sleeve slots which extend at least partly axially with respect to the respective sleeve hole or the respective base body, so that these sleeve slots together form a fitting hole after the coupling element has been fitted in the sleeve holes and after the coupling element has been rotated through the angle, and that the attachment system comprises a blocking element which is fittable in this formed fitting hole in order to prevent the coupling element in the sleeve holes from rotating.

The coupling elements comprising a cylindrical base body which is fitted in cylindrical sleeve holes produce a durable coupling in which the strong cylindrical shapes can transmit the required forces and torques.

The coupling element may be blocked radially with respect to the tube sleeves by means of the blocking pin and the blocking slot without having to use screw threads.

To this end, the blocking pin may simply be fitted in the blocking slot by means of a rotary movement by rotating the coupling element in the sleeve holes. By means of the blocking element, rotation of the coupling element in the reverse direction can easily be prevented.

In a specific embodiment, this blocking element is designed such that when this blocking element is installed in the fitting hole, when a rotational force is applied to the coupling element which remains below a breaking rotational force, the blocking element prevents the rotation of the coupling element in the sleeve holes and that when a rotational force is applied to the coupling element which exceeds the breaking rotational force, the blocking element breaks and the coupling element can again be rotated in the sleeve holes. Under normal operating conditions, where the tube ends are to be coupled together, this coupling will not disengage. Only when the blocking element is intentionally broken by applying a rotational force to the coupling element greater than the breaking rotational force or when the blocking element is removed in some other manner can the coupling be disengaged.

In addition to said sleeve slots, the sleeve holes and the base body may also be provided with additional sleeve slots which together form one or more additional fitting holes in order to fit one or more additional blocking elements therein.

In a preferred embodiment, the sleeve slots and the blocking pin are arranged in such a way that, during fitting of the coupling element in the sleeve holes, the blocking pin is guided in one or more of these sleeve slots which serve as a guide slot. In this way, the coupling element can easily be correctly positioned and fitted in the sleeve holes in order to be able to fit the blocking pin in the blocking slot with guiding action.

The sleeve hole in the female tube end is preferably configured as a perforation through the corresponding tube sleeve. The sleeve hole in the male tube end is also preferably configured as a perforation through the corresponding tube sleeve.

The coupling element can be fitted more readily in a full sleeve hole which has been made in the corresponding tube sleeve.

If one of the two sleeve holes is configured to terminate and is in this case delimited by a bottom, the coupling element may in this case be fitted in the sleeve holes, but the depth is delimited by this bottom. An ending sleeve hole in the male tube end has the advantage that the inside of the male tube end is completely protected from the female tube end. No concrete or cement moisture can penetrate between the blocking element and no concrete or cement moisture can penetrate between the male and female tube ends via this casing sleeve hole either. This makes disconnection easier.

If no such bottom is provided, the coupling element can readily be installed and removed from the sleeve holes by fitting this coupling element in the sleeve holes via a side, as desired, and by tapping it through the sleeve holes via a side in order to remove the coupling element, as desired. In this case, the coupling element may be installed/removed either from outside the tube ends inwards or from inside the tube ends outwards.

Said fitting hole for fitting the blocking element therein preferably extends through the tube sleeves, so that this blocking element may also be readily installed therein via a side and may be removed therefrom by tapping via a side through the fitting hole, as desired. However, this is not obligatory. Even if the fitting hole only extends through a part of the tube sleeves (for example only through one of the two tube sleeves), it is possible to fit a blocking element therein in order to prevent rotation of the coupling element in the reverse direction.

Continuous slots and holes which extend through a tube sleeve are easier and less expensive to produce. Thus, a piece only has to be clamped on the machine once and everything can be done from one side.

Producing the coupling in such an inexpensive way makes it possible to also fit a wear part by means of an attachment system according to the present disclosure. Such a wear part may simply be discarded after use, including the respective male tube end or female tube end. However, the coupling elements themselves may be re-used in this case and in some embodiments the blocking elements may be re-used as well.

An attachment system according to the present disclosure is suitable for coupling both round tubes and non-round tubes or elements of various diameters and of various wall thicknesses. If desired, it is also possible to couple a round tube to a square or polygonal shape by means thereof.

Preferably, however, the tube ends are of a substantially cylindrical design. By making the tube ends substantially cylindrical, these are rotatable with respect to each other. As a result of the fact that the tube ends are rotatable with respect to each other, they are more readily (dis) connectable.

During coupling, the sleeve holes should not yet be placed in the desired position with respect to each other when fitting the male tube end in the female tube end. These tube ends should first be fitted in one another and then be rotated with respect to each other until the sleeve holes are aligned with respect to each other.

In order to effect uncoupling, in some embodiments the blocking element can first be removed and in other embodiments the blocking element can first be broken. After removing the coupling element thereafter, the male tube end may be rotated with respect to the female tube end while they are still situated inside one another.

The formed fitting hole of an attachment system according to the disclosure is preferably also substantially cylindrical. Accordingly, the blocking element is then also preferably substantially cylindrical.

In order to achieve a strong coupling, the female tube end is preferably provided with several corresponding sleeve holes. The male tube end is preferably also provided with several corresponding sleeve holes.

In this case, an equal number of sleeve holes is preferably selected in both the female tube end and in the male tube end, but this is not strictly necessary.

These sleeve holes may, if desired, also be provided at different heights and/or in additional levels above one another.

The number of sleeve holes which can be aligned with each other simultaneously is equal to the number of corresponding coupling elements and blocking elements which are provided.

A tube which is formed by coupling tube ends by means of an attachment system according to the present disclosure preferably has virtually the same inner diameter along its entire length and virtually the same outer diameter along its entire length. Thus, there are no protruding parts which might impede the introduction of the tube in the ground and there are no protruding parts which could obstruct the central passage for concrete through the space of the tube. This also makes the tube ends easier to produce.

Preferably, the female tube end is provided with an inner depression which is delimited by a shoulder. The male tube end is preferably provided with a corresponding outer depression which is delimited by a shoulder. In this case, the outer depression of the male tube end is then fittable in the inner depression of the female tube end in order to fit the male tube end in the female tube end. In this case, fitting the male tube end in the female tube end is then delimited by the shoulders.

In this case, every sleeve hole in the female tube end is preferably provided in the inner depression and every sleeve hole in the male tube end is then preferably provided in the outer depression.

With only a single depression per tube end (in addition to any bevels which may be present on the edges in order to facilitate coupling), these tube ends can be produced in a very simple and durable way.

An attachment system according to the present disclosure is preferably entirely free from elastic seals.

Consequently, no recesses for installing such elastic seals are required which would unnecessarily weaken the coupling.

In order to produce foundation piles, it is not always necessary for the coupling to be completely watertight, thus making it possible for an attachment system according to the disclosure to be free from elastic seals. Due to a minimal tolerance being used, it is in any case impossible for a liquid substance with a particle size greater than this tolerance to end up inside the coupling. Should liquid from the cement end up inside the coupling, for example, then this will remain there and will itself start to act as a seal.

By means of a limited tolerances, it is also possible to couple the tube ends to each other with the aid of grease which is applied to the depressions. This grease then also partly provides a sealing action.

In addition, it is possible to use silicone which is applied to one of said shoulders or to both shoulders. If the male tube end is then fitted in the female tube end, this silicone is then present between the shoulders.

By limiting the tolerance, a coupling of tube ends using an attachment system according to the disclosure thus seals sufficiently to ensure that no water and dirt from outside can enter the tube and no dirt or concrete can flow out via the coupling.

The blocking slot of an attachment system according to the present disclosure will extend over at least a part of the circumference of either a cylindrical sleeve hole or the cylindrical base body of the coupling element. This blocking slot may, in principle, extend along the entire circumference. Preferably, this blocking slot extends only over a part of this circumference over an angle which corresponds to the angle through which the coupling element is rotatable, so that the sleeve slots are automatically aligned with respect to each other in the process in order to form the fitting hole together.

More specifically, the blocking slot of an attachment system according to the present disclosure may be configured to taper, so that when the blocking pin is fitted in this blocking slot, this blocking pin will also engage in the blocking slot when the coupling element has not been fitted sufficiently far or too far in the sleeve holes. During rotation of the coupling element, the blocking slot will then guide the blocking pin to the desired position, in which the coupling element is also fitted at the desired depth in the sleeve holes. However, in a simple embodiment, the blocking slot will be configured as a slot which is delimited in the length direction by parallel walls.

The coupling element is preferably only rotated through a limited angle in the sleeve holes. The angle through which the coupling element is rotatable, is to this end preferably limited to an angle of less than 360°. More preferably, this angle is limited to an angle of less than 180° and most preferably to an angle of less than 90° or even less than 45°. As has already been indicated above, this angle may in this case be, for example, limited by accordingly delimiting the blocking slot.

Furthermore preferably, the coupling element comprises an engagement element which is to be engaged by a hand tool in order to rotate this coupling element. This engagement element can also be used for inserting the coupling element into the sleeve holes during installation and for removing the coupling element from the sleeve holes during dismantling. In this case, one or more such engagement elements may be provided. Such an engagement element is preferably configured as an engagement hole. This engagement hole(s) in the blocking element may be made as a perforation through the blocking element or ending or a combination.

In a particular embodiment, the blocking pin will be provided on the base body and the blocking slot will end in the outer sleeve surface of the male tube end. In this way, the blocking slot may be protected from wear by the female tube end.

BRIEF DESCRIPTION OF THE DRAWINGS

The present invention will now be explained in more detail by means of the following description of some embodiments of attachment systems according to the present invention. The sole aim of this description is to give illustrative examples and to indicate further advantages and features of the present invention, and can therefore by no means be interpreted as a limitation of the area of application of the invention or of the patent rights defined in the claims.

Reference numerals are used in this description to refer to the attached drawings, in which.

DETAILED DESCRIPTION

The illustrated attachment systems (1) in each case comprise a female tube end (4) and a male tube end (5) which form part of tubes (2, 3) which may be coupled to form an assembled tube. Alternatively, one of the two tube ends (4, 5) could also form part of a wear part, such as for example a drill bit.

In the figures, the male tube end (5) is always shown at the top and the female tube end (4) is always shown at the bottom. However, it is readily possible to place the female tube end (4) at the top and the male tube end (5) at the bottom.

The illustrated tube ends (4, 5) have a circular cross section, but could also be provided with a different cross section, as is the case with tube ends according to the prior art.

The female tube end (4) is provided with an inner depression (20) which is delimited by a shoulder (17). In a corresponding manner, the male tube end (5) is provided with an outer depression (21) which is delimited by a shoulder (18). The outer depression (21) of the male tube end (5) is fittable in the inner depression (20) of the female tube end (4). Bevels (22) are provided along the edges of the depressions (20, 21) in order to facilitate (de) coupling. The shoulders (17, 18) delimit the fitting of the male tube end (5) in the female tube end (4). The dimensions of the two tube ends (4, 5) are in accordance therewith, with limited tolerances. In order nevertheless to be able to fit these tube ends (4, 5) with this limited tolerance smoothly in each other, grease may be applied in the depressions (20, 21).

The inner depression (20) of the female tube end (4) comprises additional cylindrical sleeve holes (8) which are distributed over the circumference of the tube end (4). These cylindrical sleeve holes (8) penetrate the tube sleeve of the female tube end (4) completely.

Figure 9:
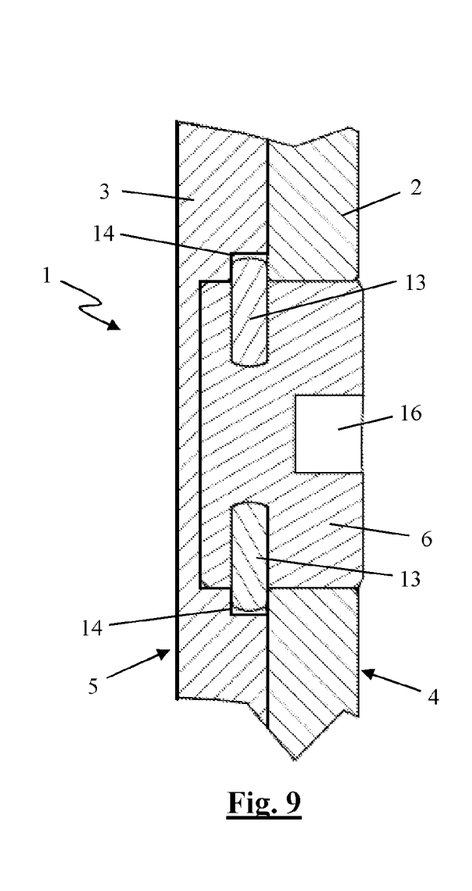
FIG. 9 a fourth embodiment of an attachment system according to the present disclosure is shown in longitudinal section, cut across the coupling element.

The outer depression (21) of the male tube end (5) comprises additional corresponding cylindrical sleeve holes (9) which are distributed over the circumference of the tube end (5). In the first three illustrated embodiments, these cylindrical sleeve holes (9) also penetrate the tube sleeve of the male tube end (5) completely. In the last embodiment shown (see FIG. 9) this cylindrical sleeve hole is ending.

Due to the fact that the tube ends (4, 5) are cylindrical, they are rotatable with respect to each other. The sleeve holes (8, 9) are arranged in such a way that corresponding male and female sleeve holes (8, 9) can be aligned with each other. In the illustrated embodiments, every sleeve hole (9) in the male tube end (5) in this case adjoins a corresponding sleeve hole (8) in the female tube end (4).

Figure 8:
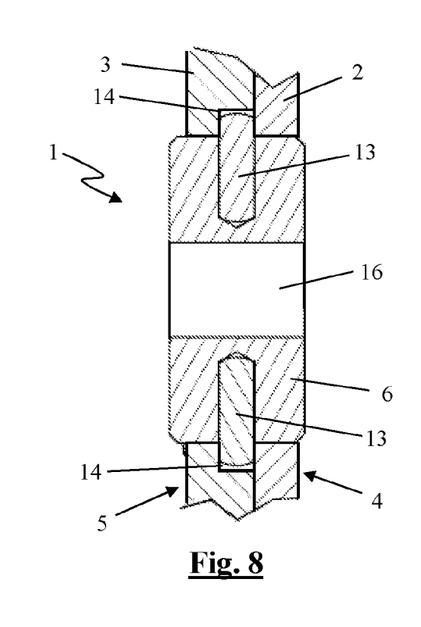
FIG. 8 a third embodiment of an attachment system according to the present disclosure is shown in longitudinal section, cut across the coupling element.

For every pair of corresponding sleeve holes (8, 9) which are aligned in this way, the illustrated attachment systems (1) comprise a coupling element (6). This coupling element (6) has a cylindrical base body (7) which is fittable in these sleeve holes (8, 9) when the sleeve holes (8, 9) have been aligned with respect to each other in order to couple the tube ends (4, 5) to each other. In this case, the base body (7) has the same cylindrical shape as the sleeve holes (8, 9) and is slightly smaller with minimal tolerance. In the first two illustrated embodiments, the height of this base body (7) virtually corresponds to the thicknesses of the tube sleeves of the tube ends (4, 5), which also virtually corresponds to the sum of the thicknesses of the depressed part (20, 21) of these tube ends (4, 5). In the third embodiment (see FIG. 8), the base body (7) of the coupling element (6) is slightly higher, and in the fourth embodiment (see FIG. 9), the base body (7) is less high.

In the first three illustrated embodiments, the sleeve holes (8, 9) extend through the tube sleeves of the tube ends (4, 5), so that the coupling element (6) is fittable in or removable from these sleeve holes (8, 9) from the outside as well as the inside. In alternative embodiments, in which one of the two sleeve holes (8, 9) is designed as a terminating hole, the coupling element (6) will only be fittable in or removable from these sleeve holes (8, 9) from one of the two sides. This is the case in the fourth illustrated embodiment in FIG. 9.

In the first illustrated embodiment and the last two illustrated embodiments, the coupling element (6) of the attachment system (1) is furthermore provided with a blocking pin (13) which is raised radially with respect to the sleeve surface of the base body (7).

In this case, every sleeve hole (9) in the male tube end (5) is provided with a corresponding blocking slot (14). This blocking slot (14) is formed in the sleeve surface of this sleeve hole (9) in the shape of an arc across part of the circumference of this sleeve surface. This blocking slot (14) ends on the outer circumference of the male tube end (5) and is protected by the female tube end (4) when the male tube end (5) is fitted in the female tube end (4) in order to limit wear of this blocking slot (14). Alternatively, the blocking slot (14) may optionally be provided in the female tube end (4) and may in this case be produced in a similar way.

Conversely, in the second illustrated embodiment, every sleeve hole (9) in the male tube end (5) is provided with a blocking pin (13) which is raised radially with respect to the sleeve surface of this sleeve hole (9). Alternatively, the blocking pin (13) may be provided in the female tube end (4), if desired.

In this second embodiment, the coupling element (6) is provided with a blocking slot (14) which corresponds to the blocking pin (13). This blocking slot (14) is formed in the sleeve surface of the coupling element (6) in the shape of an arc across part of the circumference of this sleeve surface.

In all embodiments, the blocking pin (13) and blocking slot (14) are arranged in such a way that when the coupling element (6) has been fitted in a sleeve hole (9), the blocking pin (13) engages in the blocking slot (14) upon rotation of the coupling element (6).

In each case, the blocking slot (14) extends only across a part of the circumference of the sleeve hole (9) of the coupling element (6), so that the rotation of the coupling element (6) in the sleeve hole (9) is limited to an angle which corresponds to the length of the arc of this blocking slot (14).

If desired, still further blocking pins and corresponding blocking slots may be provided in addition to the illustrated blocking pin (13) and the illustrated blocking slot (14), for example distributed over the circumference of the cylinder shapes.

In the illustrated embodiments, the sleeve holes (8, 9) are furthermore provided with corresponding sleeve slots (11, 12) which extend axially with respect to the respective sleeve hole (8, 9) and are also aligned with each other when the sleeve holes (8, 9) are being aligned with each other. The base body (7) is furthermore provided with a sleeve slot (10) which corresponds to these sleeve slots (11, 12) and extends axially with respect to the base body (7) and forms a fitting hole together with the sleeve slots (11, 12) in the sleeve holes (8, 9), once the coupling element (6) has been fitted in the sleeve holes (8, 9) and after the coupling element (6) has been rotated through said angle. To this end, the sleeve slots (10, 11, 12) are dimensioned in a corresponding manner.

For every fitting hole which can be formed in this way, the illustrated embodiments comprise a blocking element (15) which is fittable in this formed fitting hole in order to prevent rotation of the coupling element (6) in the sleeve holes (8, 9). In the last two embodiments, the fitting holes and the blocking elements are not shown on the figures, but are provided in a similar way.

Each illustrated fitting hole extends through the tube sleeves, so that the corresponding blocking element (15) is fittable in or removable from these fitting holes from both the outside and the inside. In alternative embodiments, in which the fitting hole is configured to terminate, the blocking element (15) will only be fittable in and removable from this fitting hole from one of the two sides.

This may be the case, for example, because only one of the two sleeve holes (8, 9) is provided with a said sleeve slot (11 12), or because these sleeve slots (11, 12) are correspondingly executed with sleeve holes (8, 9) and coupling elements (6) which do not extend through the tube sleeves of both the male tube end (5) and the female tube end (4), as in the fourth illustrated embodiment.

In the illustrated embodiments, the fitting holes are cylindrical. In alternative embodiments, the fitting holes may also have a different shape, this being achieved by shaping the corresponding sleeve slots (10, 11, 12) differently.

In the first illustrated embodiment and the last two illustrated embodiments, the sleeve slots (11, 12) in the sleeve holes (8, 9) furthermore serve as a guide slot for guiding the blocking pin (13) when fitting the coupling element (6) in the sleeve holes (8, 9).

In the second illustrated embodiment, the sleeve slot (10) in the base body (7) furthermore serves as a guide slot for guiding the blocking pin (13) when fitting the coupling element (6) in the sleeve holes (8, 9).

In the illustrated embodiments, the coupling element (6) is in each case furthermore provided with an engagement hole (16) which is to be engaged with by a hand tool (23) in order to rotate the coupling element (6) and/or to push or pull the coupling element (6) into or out of the sleeve holes (8, 9), respectively.

This engagement hole (16) may be provided through the coupling element (6) as in the first three illustrated embodiments, or may be terminated as in the last illustrated embodiment. It is also possible to provide a combination of both.

Instead of providing one such engagement hole (16), it is also possible to provide several engagement holes of this kind.

The female tube end (4) and the male tube end (5) are preferably made of metal. More specifically, these may be made of, for example, steel of type S355 which is subjected to additional hardening. Alternatively, these could be made of, for example, 42CrMo4 with an additional hardening step. Alternatively, they could be made of spheroidal graphite cast iron, cast steel or forged steel.

The coupling elements (6) are preferably also made of metal. More specifically, these may be made of, for example, 42CrMo4 which is subjected to an additional oil hardening step. Alternatively, these could be made of, for example, S355, with an additional hardening step.

Figure 4:
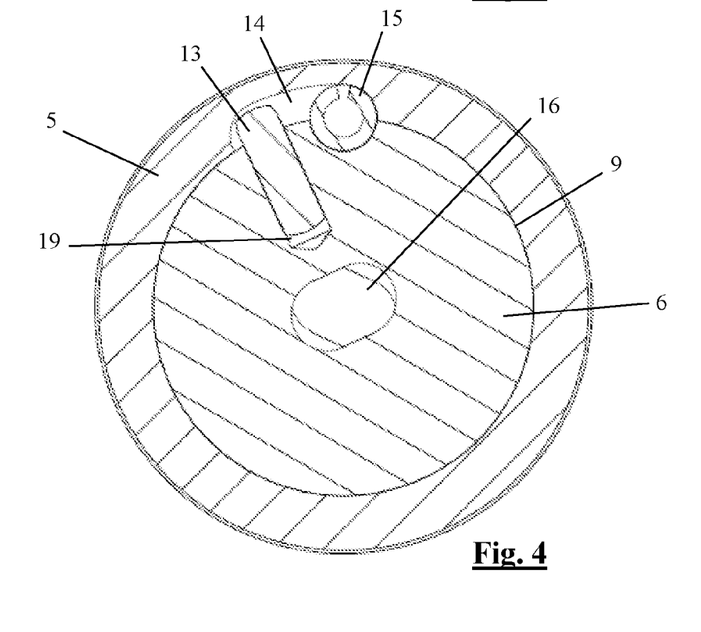
FIG. 4 shows a cross section of a part of the attachment system from FIG. 1, cut across the coupling element.
Figure 5:
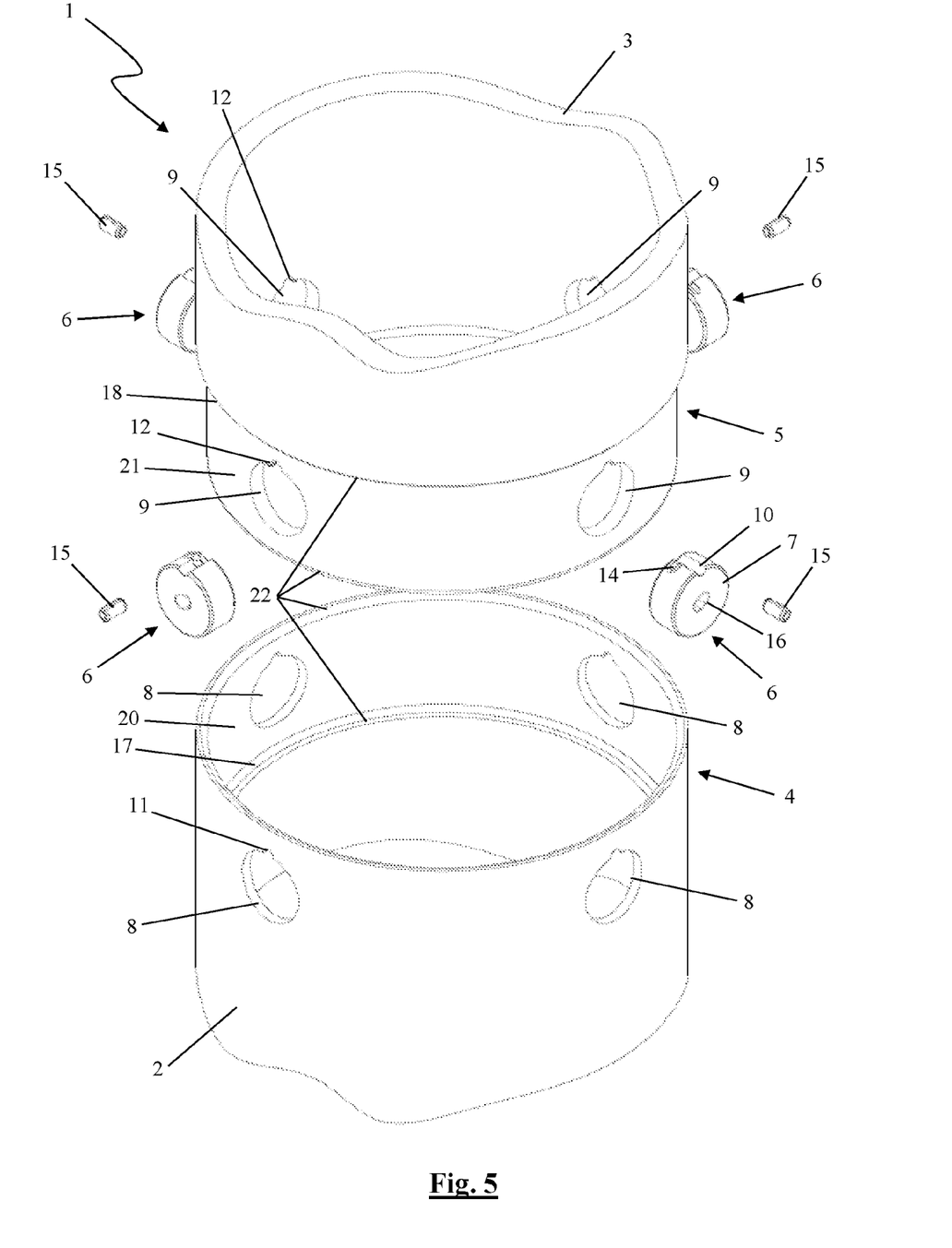
FIG. 5 shows a second embodiment of an attachment system according to the present disclosure in perspective, in a cut-away view and seen from above.
Figure 6:
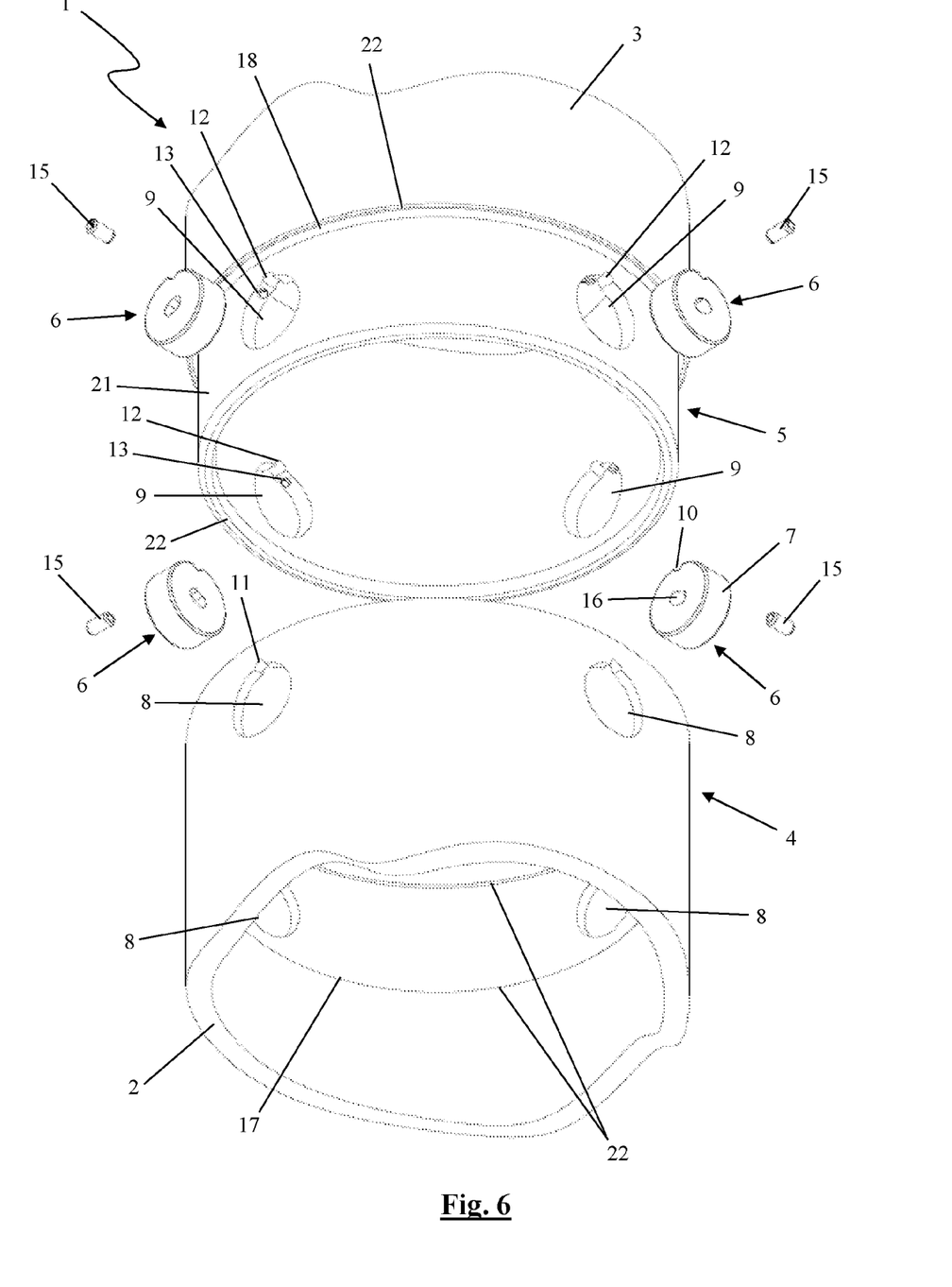
FIG. 6 shows the attachment system from FIG. 5 in perspective, in a cut-away view, seen from below.
Figure 7A:
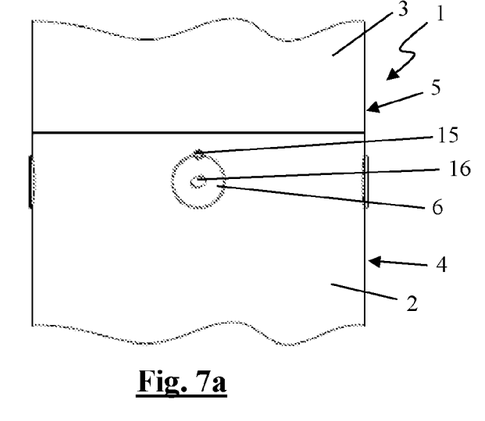
FIG. 7a-7f show in several steps with the attachment system of FIG. 1 in views and a perspective how starting from a composite state, when applying a rotational force above a breaking rotational force, the blocking element breaks and the coupling element is again rotatable in the sleeve holes and removable from them.
Figure 7B:
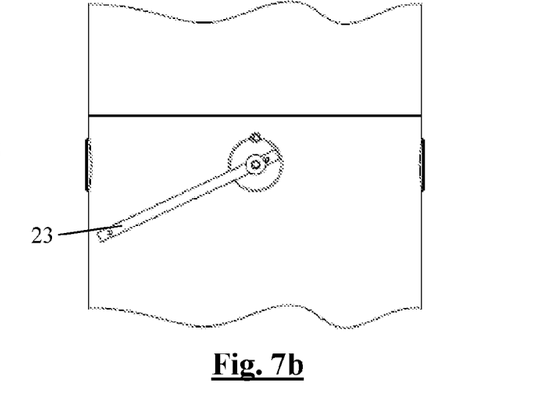
Figure 7C:
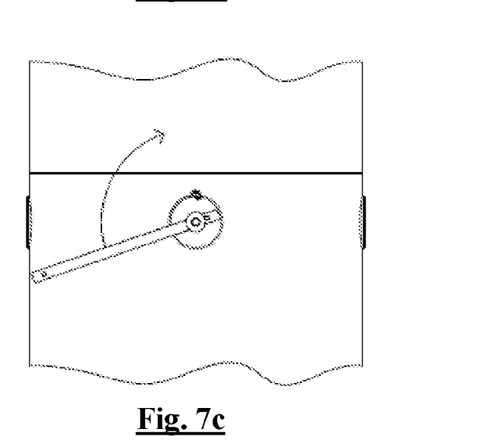
Figure 7D:
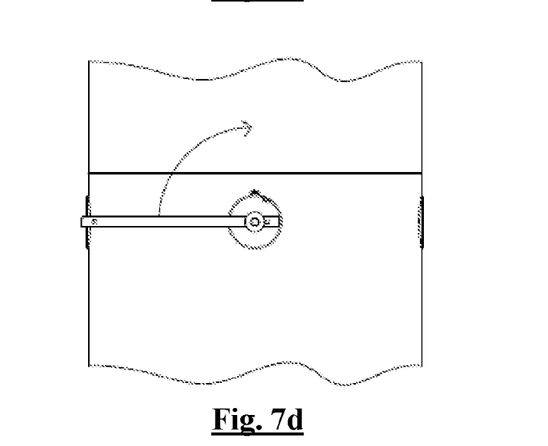
Figure 7E:
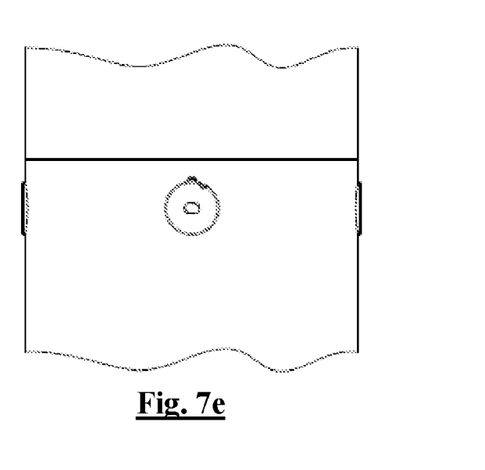
Figure 7F:
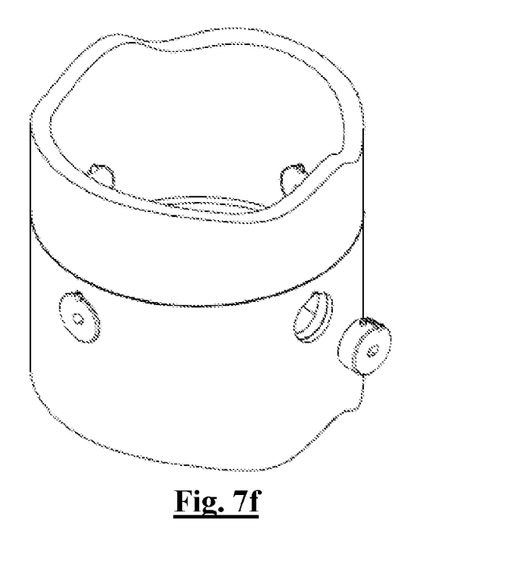

For the blocking pins (13) and blocking elements (15), standard elements which are commercially available may be chosen. In order to secure the blocking pins (13), a hole (19) may be drilled in the corresponding component, as shown in FIG. 4, into which this blocking pin (13) may be fitted.

In order to couple the tube ends (4, 5) by means of an illustrated attachment system (1), the male tube end (5) is pushed into the female tube end (4). Subsequently, the sleeve holes (8, 9) are aligned with respect to each other, for example by means of a guide plug which is provided with a conical end and thus guides the sleeve holes (8, 9) to the correct positions. In this case, these sleeve holes (8, 9) are aligned in such a way that they are situated opposite one another in a straight line.

The coupling elements (6) are placed in the respective sleeve holes (8, 9) by guiding the blocking pin (13) into the corresponding sleeve slots (11, 12) or into the corresponding sleeve slot (10).

Then, the coupling elements (6) are rotated by means of a tool (23), by the tool (23) engaging in the engagement slot (16) in such a way that the blocking pin (13) comes to lie in the blocking slot (14). The coupling elements (6) are rotated in such a way that the sleeve slots (10, 11, 12) of both the coupling elements (6) and the sleeve holes (8, 9) are aligned. The blocking elements (15) which prevent rotation of the coupling elements (6) are arranged in the fitting holes which have thus been formed.

All coupling elements (6) and blocking elements (15) can be removed again from the tube ends (4, 5) by following the reverse order and can then be re-used.

As illustrated in FIGS. 7a-7f, it is also possible to select a blocking element (15) such that, when a rotational force is applied in excess of a breaking rotational force, the blocking element (15) breaks and the coupling element (6) is again rotatable in the sleeve holes (8, 9). In this case, it will of course not be possible to reuse these blocking elements (15).

These blocking elements (15) may be made, for example, of a material weaker than the material from which the tube ends (4, 5) and the coupling elements (6) are made. If the same material or a stronger material is used, such a blocking element (15) must be provided with a weakening in such a way that it is the weakest link in the whole and will break first.

Preferably, the blocking element (15) consists of a plastic tube or tube cap. Such tube caps are commercially available parts that are relatively inexpensive. These tube caps are equipped with a ribbed sleeve surface. This ribbed sleeve surface helps, on the one hand, to ensure that the blocking element (15) cannot slide out of the fitting hole. On the other hand, this ribbed sleeve surface helps to ensure that this tube cap breaks easily when turning the coupling element (6) with a rotational force higher than the mentioned breaking rotational force, but is sufficiently strong to prevent the coupling element (6) from turning on its own.

This blocking element (15) shall be sufficiently strong so that the coupling element (6) cannot rotate of its own under normal conditions of use and yet sufficiently weak so that the blocking element (15) does not have to exert an excessive breaking rotation force on the coupling element (6). This breaking rotational force will depend on the material from which the blocking element (15) is made and on the number of blocking elements (15) used per coupling element (6).

Knowing the rotational forces acting on the coupling element (6) under normal conditions of use of the attachment system (1), it is possible to select the said blocking elements (15), their number and the material from which they are made, judiciously.

Figure 1:
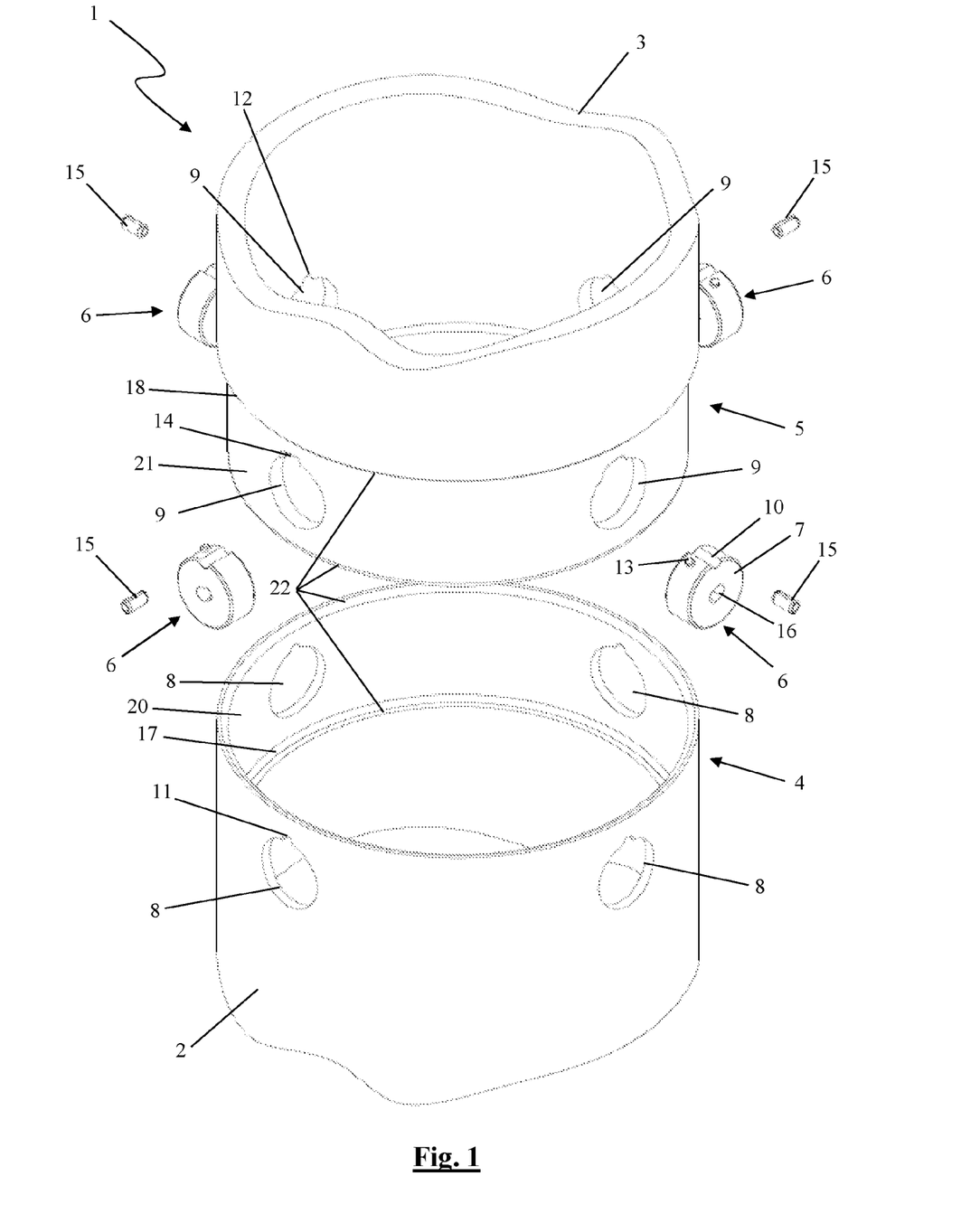
FIG. 1 shows a first embodiment of an attachment system according to the present disclosure in perspective, in a cut-away view and seen from above.
Figure 2:
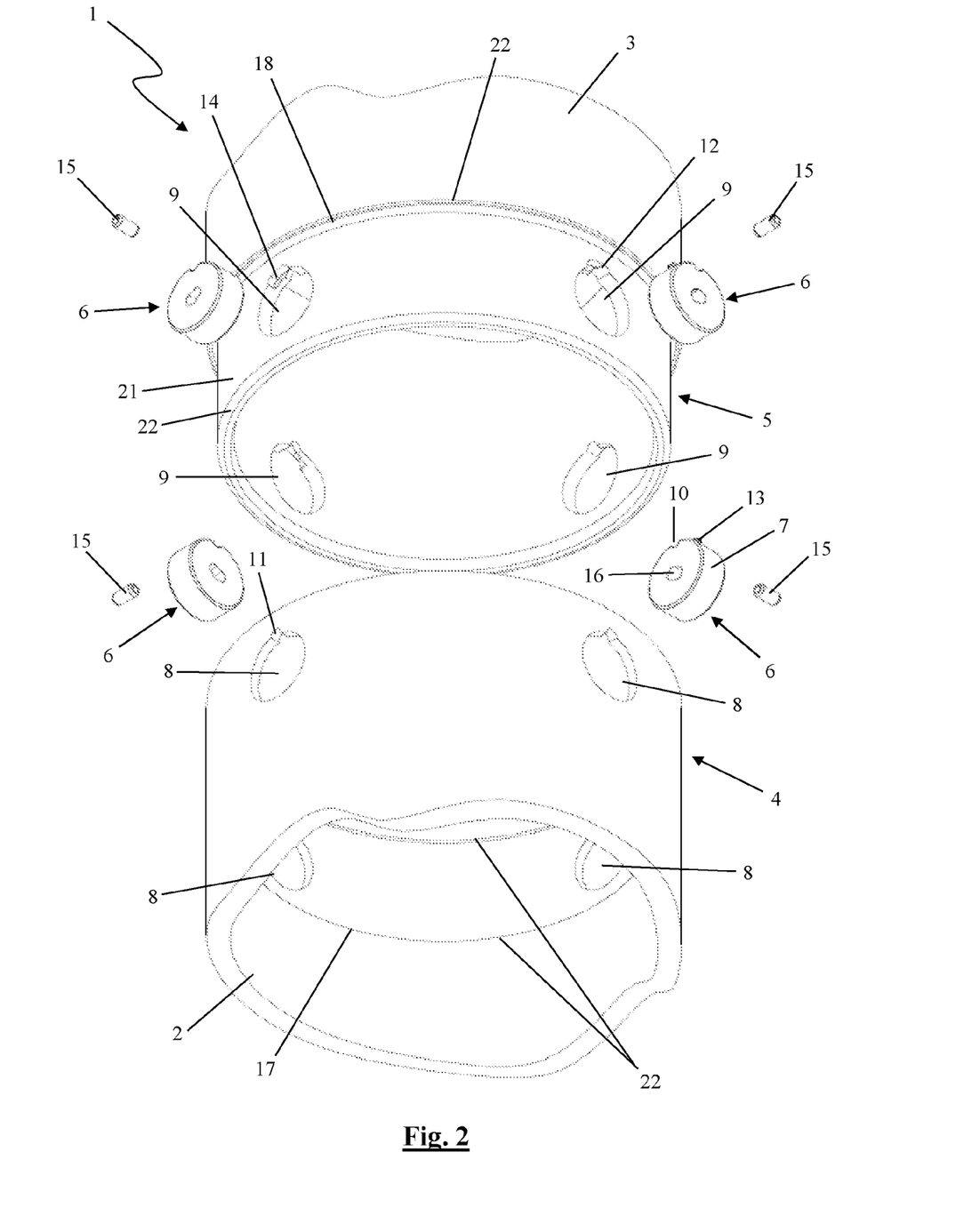
FIG. 2 shows the attachment system from FIG. 1 in perspective, in a cut-away view, seen from below.
Figure 3:
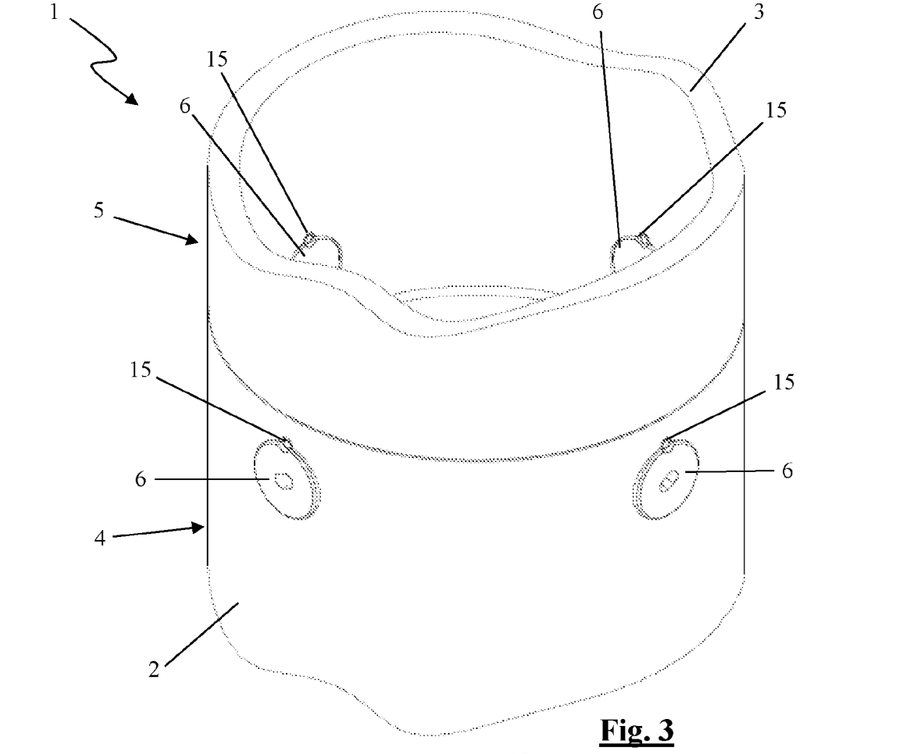
FIG. 3 shows the attachment system from FIG. 1 in perspective, in the assembled state, seen from above.

One knows for example that in the first illustrated embodiment, a rotational force of approximately 0.5 Nm is required to rotate the coupling element (6) when no blocking element (15) is present in the fitting element. If the attachment system (1) is fully assembled with the coupling elements (6) and the blocking elements (15) in mounted position and this is used to create a foundation pile, then a maximum torque force of approximately 100 Nm can be applied to the coupling element (6), for example. If the blocking elements (15) do not break at this maximum torque force, then theoretically this is sufficiently strong. In practice, a safety margin is preferable and, for example, the blocking elements (15) can be selected such that they break at a torque force on the coupling element (6) of approximately 350 Nm.

The invention claimed is:

1. Attachment system for detachably coupling a female tube end and a male tube end to each other in order to form foundation piles, the system comprising:
   a cylindrical sleeve hole in a tube sleeve of the female tube end;

a corresponding cylindrical sleeve hole in a tube sleeve of the male tube end, the corresponding cylindrical sleeve hole being alignable with the cylindrical sleeve hole in the female tube end when the male tube end is being fitted in the female tube end;

a coupler comprising a cylindrical base body which is fittable in the cylindrical sleeve hole and the corresponding cylindrical sleeve hole when the cylindrical sleeve hole and the corresponding cylindrical sleeve hole have been aligned with respect to each other, in order to couple the female tube end and the male tube end to each other;

a blocking pin which is provided on, and extends radially with respect to, the base body, the cylindrical sleeve hole, or the corresponding cylindrical sleeve hole;

a blocking slot which is provided in the cylindrical sleeve hole or the corresponding cylindrical sleeve hole, or the base body, respectively, and in which the blocking pin is fittable; and a blocker, wherein the blocking pin and the blocking slot are arranged in such a way that the coupler is rotatable through an angle after the coupler has been fitted in the cylindrical sleeve hole and the corresponding cylindrical sleeve hole, wherein fitting of the coupler in the cylindrical sleeve hole and corresponding cylindrical sleeve hole fits the blocking pin in the blocking slot;

wherein at least one of the cylindrical sleeve hole and the corresponding cylindrical sleeve hole, and (ii) the base body are provided with corresponding sleeve slots which extend at least partly axially with respect to the respective sleeve hole or the base body, wherein the sleeve slots together form a fitting hole after the coupler has been fitted in the cylindrical sleeve hole and the corresponding cylindrical sleeve hole and after the coupler has been rotated through the angle, and wherein the blocker is fittable in the fitting hole in order to prevent the coupler from rotating in the cylindrical sleeve hole and the corresponding cylindrical sleeve hole.

2. Attachment system according to claim 1, wherein the blocker is so designed that when the blocker is inserted into the fitting hole, and a rotational force on the coupler remains below a breaking rotational force, the blocker prevents the coupler from rotating in the cylindrical sleeve hole and the corresponding cylindrical sleeve hole, and when a rotational force is applied to the coupler above the breaking rotational force, the blocker breaks and the coupler is rotatable in the cylindrical sleeve hole and the corresponding cylindrical sleeve hole.

3. Attachment system according to claim 1, wherein the sleeve slots and the blocking pin are arranged in such a way that, during fitting of the coupler in the cylindrical sleeve hole and the corresponding cylindrical sleeve hole, the blocking pin is guided in one or more of the sleeve slots which serve as a guide slot.

4. Attachment system according to claim 1, wherein the sleeve hole in the female tube end and/or the sleeve hole in the male tube end is configured as a perforation through the corresponding tube sleeve.

5. Attachment system according to claim 1, wherein the fitting hole extends through the tube sleeves.

6. Attachment system according to claim 1, wherein both the female tube end and the male tube end are substantially cylindrical.

7. Attachment system according to claim 1, wherein the fitting hole is substantially cylindrical.

8. Attachment system according to claim 1, wherein the female tube end is provided with several of the cylindrical sleeve holes and/or the male tube end is provided with several of the corresponding cylindrical sleeve holes.

9. Attachment system according to claim 1, wherein the female tube end is provided with an inner depression which is delimited by a first shoulder wherein the male tube end is provided with a corresponding outer depression (21) which is delimited by a second shoulder, wherein the outer depression of the male tube end is fittable in the inner depression of the female tube end in order to fit the male tube end in the female tube end, and wherein fitting the male tube end in the female tube end is delimited by the first shoulder and the second shoulder.

10. Attachment system according to claim 9, wherein one or more of the cylindrical sleeve holes in the female tube end is provided in the inner depression, and wherein one or more of the corresponding cylindrical sleeve holes in the male tube end is provided in the outer depression.

11. Attachment system according to claim 9, wherein the male tube end is fitted in the female tube end, and wherein silicone is applied between the first shoulder and the second shoulder.

12. Attachment system according to claim 1, wherein the blocking slot is configured to taper.

13. Attachment system according to claim 1, wherein the coupler comprises an engager which is to be engaged by a hand tool in order to rotate the coupler.

14. Attachment system according to claim 1, wherein the blocking pin is provided on the base body, and in that wherein the blocking slot ends in an outer sleeve surface of the male tube end.

* * * * *